United States Patent
Egner et al.

(10) Patent No.: US 9,826,334 B2
(45) Date of Patent: *Nov. 21, 2017

(54) METHOD AND APPARATUS FOR CONNECTION CONTEXT AWARE RADIO COMMUNICATION MANAGEMENT

(71) Applicant: Dell Products, LP, Round Rock, TX (US)

(72) Inventors: Will A. Egner, Cedar Park, TX (US); Christopher Labrador, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,539

(22) Filed: Mar. 9, 2016

(65) Prior Publication Data

US 2016/0192109 A1 Jun. 30, 2016

Related U.S. Application Data

(63) Continuation of application No. 14/804,317, filed on Jul. 20, 2015, now Pat. No. 9,313,603, which is a continuation of application No. 13/604,906, filed on Sep. 6, 2012, now Pat. No. 9,088,859.

(51) Int. Cl.
| | |
|---|---|
| *H04W 4/04* | (2009.01) |
| *H04W 48/18* | (2009.01) |
| *H04W 52/02* | (2009.01) |
| *H04W 4/00* | (2009.01) |
| *H04W 72/08* | (2009.01) |
| *H04L 29/08* | (2006.01) |

(52) U.S. Cl.
CPC ........... *H04W 4/003* (2013.01); *H04L 67/306* (2013.01); *H04W 4/00* (2013.01); *H04W 72/08* (2013.01)

(58) Field of Classification Search
CPC ....... H04W 4/028; H04W 4/027; H04W 4/04; H04W 4/043; H04W 4/046; H04W 48/18; H04W 4/26; H04W 64/00; H04W 64/003; H04W 64/006; H04W 72/08; H04W 72/00; H04W 72/02; H04W 72/04; H04W 72/06; H04W 72/10
USPC .... 455/456.1–456.6, 452.2, 450, 451, 452.1, 455/440, 441
See application file for complete search history.

(56) References Cited

U.S. PATENT DOCUMENTS

| | | |
|---|---|---|
| 7,013,145 B1 | 3/2006 | Centore, III |
| 8,666,048 B2 | 3/2014 | Beerse et al. |
| 2004/0192341 A1 | 9/2004 | Wang et al. |

(Continued)

*Primary Examiner* — Philip Sobutka
(74) *Attorney, Agent, or Firm* — Prol Intellectual Property Law, PLLC; H. Kenneth Prol

(57) ABSTRACT

An information handling system comprising a wireless adapter for communicating via a wireless link and a storage device for storing a spatial-temporal user profile comprising wireless service usage trend data for a location where the information handling system is operating. The storage device further stores radiofrequency wireless traffic reports indicating signal quality for a plurality of wireless links available at the location and an application processor executes code of a context aware radiofrequency resource management system in determining link ratings for the plurality of wireless links available at the location based on the wireless service usage trend data for the information handling system and signal quality for the available wireless protocols for anticipated wireless service usage.

20 Claims, 7 Drawing Sheets

(56) References Cited

U.S. PATENT DOCUMENTS

| | | |
|---|---|---|
| 2005/0041696 A1 | 2/2005 | Pekonen |
| 2005/0215290 A1 | 9/2005 | Wakabayashi et al. |
| 2006/0268849 A1 | 11/2006 | Larsson et al. |
| 2007/0060130 A1 | 3/2007 | Gogic et al. |
| 2009/0181695 A1 | 7/2009 | Wirola et al. |
| 2009/0279502 A1 | 11/2009 | Zheng et al. |
| 2009/0319348 A1 | 12/2009 | Khosravy et al. |
| 2010/0202376 A1 | 8/2010 | Zhu et al. |
| 2010/0220665 A1 | 9/2010 | Govindan et al. |
| 2011/0143761 A1 | 6/2011 | Uusitalo et al. |
| 2012/0057569 A1 | 3/2012 | Xie et al. |
| 2013/0023274 A1 | 1/2013 | Meredith et al. |

METHOD AND APPARATUS FOR CONNECTION CONTEXT AWARE RADIO COMMUNICATION MANAGEMENT

CROSS REFERENCE TO RELATED APPLICATIONS

This application is a continuation of U.S. patent application Ser. No. 14/804,317, entitled "Method and Apparatus for Connection Context Aware Radio Communication Management," filed on Jul. 20, 2015, which is a continuation of U.S. patent application Ser. No. 13/604,906, entitled "Method and Apparatus for Connection Context Aware Radio Communication Management," filed on Sep. 6, 2012, now issued U.S. Pat. No. 9,088,859, issued Jul. 21, 2015, the disclosure of which is hereby expressly incorporated by reference in its entirety.

FIELD OF THE DISCLOSURE

The present disclosure generally relates to a method and apparatus for a radio resources communication management system to adapt to context and usage of communication channels.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
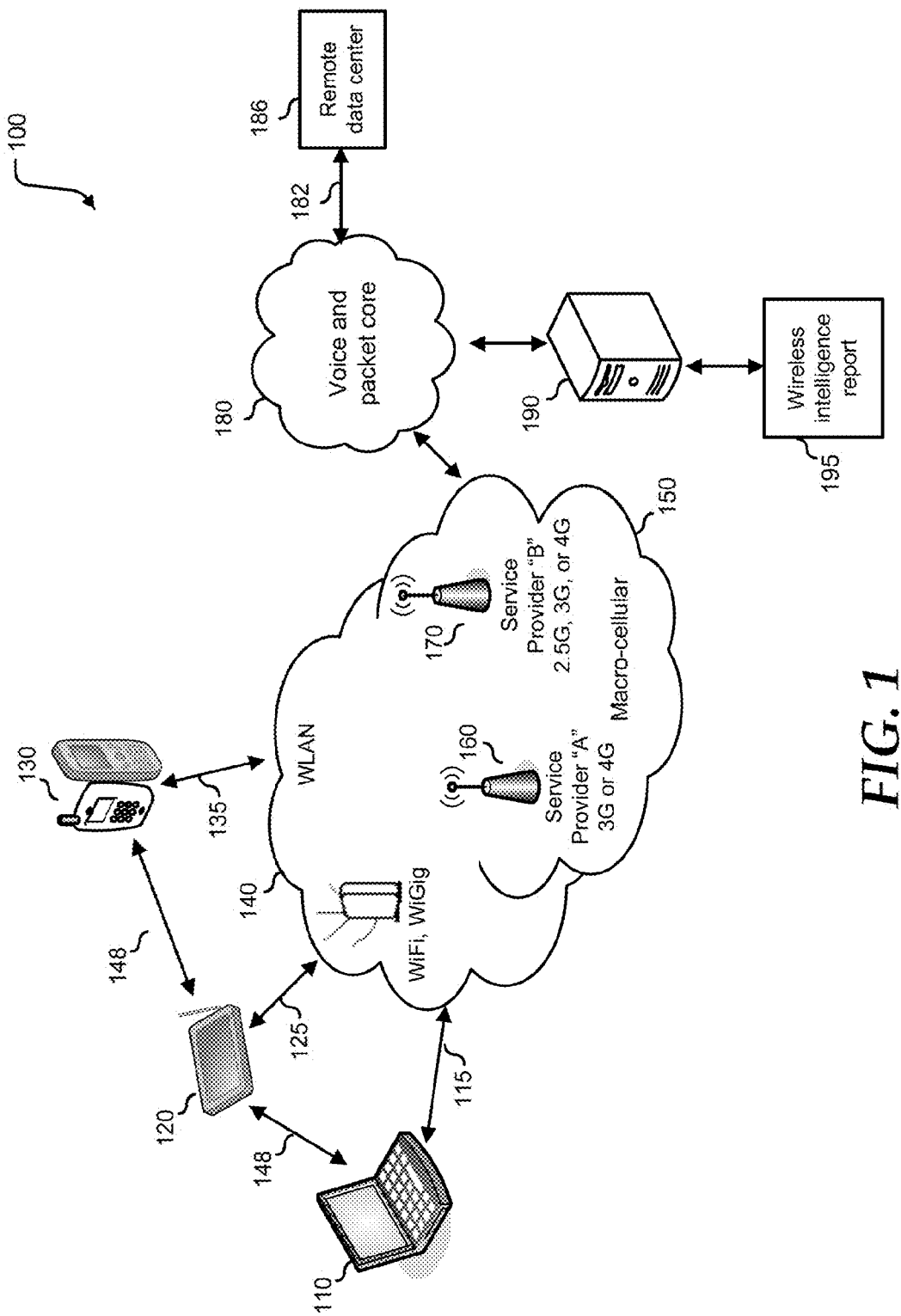
FIG. 1 is a block diagram of a network environment offering several communication protocol options according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a mobile information handling system, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, network 100 includes networked mobile information handling systems 110, 120, and 130, wireless network access points, and multiple wireless connection link options. Systems 110, 120, and 130 represent a variety of computing resources of network 100 including client mobile information handling systems, data processing servers, network storage devices, local and wide area networks, or other resources as needed or desired. As specifically depicted, systems 110, 120, and 130 may be a laptop computer, tablet computer, or smartphone device.

These user mobile information handling systems 110, 120, and 130, may access a wireless local area network 140, or they may access a macro-cellular network 150. For example, the wireless local area network 140 may be the wireless local area network (WLAN), a wireless personal area network (WPAN), or a wireless wide area network (WWAN). Since WPAN or WiFi Direct Connection 148 and WWAN networks can functionally operate similar to WLANs, they may be considered as wireless local area networks (WLANs) for purposes herein. Components of a WLAN may be connected by wireline or Ethernet connections to a wider external network. For example, wireless network access points 145 may be connected to a wireless network controller and an Ethernet switch. Wireless communications across wireless local area network 140 may be via standard protocols such as IEEE 802.11 Wi-Fi, IEEE 802.11ad WiGig, IEEE 802.15 WPAN or similar wireless network protocols. Alternatively, other available wireless links within network 100 may include macro-cellular connections 150 via one or more service providers 160 and 170. Service provider macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 180 may contain externally accessible computing resources and connect to a remote data center 186. The voice and packet core network 180 may contain multiple intermediate web servers or other locations with accessible data (not shown). Connection 182 between the wireless network 140 and remote data center 186 may be via Ethernet or another similar connection to the world-wide-web, a WAN, a LAN, another WLAN, or other network structure. Such a connection 182 via WLAN access point/Ethernet switch 145 to the external network is a backhaul connection. The access point 145 may be connected to one or more wireless access points in the WLAN before connecting directly to a mobile information handling system or may connect directly to one or more mobile information handling systems 110, 120, and 130. Alternatively, mobile information handling systems 110, 120, and 130 may connect to the external network via base station locations at service providers such as 160 and 170. These service provider locations may be network connected via backhaul connectivity through the voice and packet core network 180.

Remote data center 186 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 110, 120, and 130 allowing streamlining and efficiency within those devices. Similarly, remote data center 186 permits fewer resources to be maintained in other parts of network 100.

In an example embodiment, the cloud or remote data center 186 may run hosted applications for systems 110, 120, and 130. This may occur by establishing a virtual machine application executing software to manage applications hosted at the remote data center 186. Mobile information handling systems 110, 120, and 130 are adapted to run one or more applications locally, and to have hosted applications run in association with the local applications at remote data center 186. The virtual machine application may serve one or more applications to each of user mobile information handling systems 110, 120, and 130. Thus, as illustrated, systems 110, 120, and 130 may be running applications locally while requesting data objects related to those applications from the remote data center 186 via wireless network. For example, an electronic mail client application may run locally at system 110. The electronic mail client application may be associated with a host application that represents an electronic mail server. In another example, a data storage client application such as Microsoft Sharepoint may run on system 120. It may be associated with a host application running at remote data center 186 that represents a Sharepoint data storage server. In a further example, a web browser application may be operating at system 130. The web browser application may request web data from a host application that represents a hosted website and associated applications running at remote data center 186.

To communicate within the network 100, the systems 110, 120, and 130 each have a wireless interface module or wireless adapter, hereinafter referred to as a wireless adapter. System 110 includes a wireless adapter, system 120 includes a wireless adapter, and system 130 includes a wireless adapter. The wireless adapters are operable to provide a wireless radio frequency interface 115, 125, and 135 to transmit and receive voice and data between the respective systems 110, 120, and 130 and one or more external networks via wireless network 140 or 150.

Although 115, 125, and 135 are shown connecting wireless adapters to wireless networks 140 or 150, actual wireless communication may link through a wireless access point 145 or a service provider tower such as that shown with service provider A 160 or service provider B 170. A wireless link may also be made between the wireless adapter and another mobile information handling system in a WPAN or WiFi Direct Connection 148. Since one aspect of the disclosed embodiments involves selection of wireless links by a context aware radio resource management system, no particular wireless link selection is depicted in FIG. 1.

The wireless adapters can represent add-in cards, wireless network interface modules that are integrated with a main board of respective systems 110, 120, and 130 or integrated with another wireless network interface capability, or any combination thereof. In an embodiment the wireless adapters may include one or more radio frequency subsystems including transmitters and wireless controllers for connecting via a multitude of wireless links. In an example embodiment, a mobile information handling system may have a transmitter for Wifi or WiGig connectivity and one or more transmitters for macro-cellular communication. The radio frequency subsystems include wireless controllers to manage authentication, connectivity, communications, power levels for transmission, buffering, error correction, baseband processing, and other functions of the wireless adapters.

The radio frequency subsystems of the wireless adapters may measure various metrics relating to wireless communication. For example, the wireless controller of a radio frequency subsystem may manage detecting and measuring received signal strength levels, bit error rates, signal to noise ratios and other metrics relating to signal quality and strength. In one embodiment, a wireless controller may manage one or more radio frequency subsystems within a wireless adapter. The wireless controller also manages transmission power levels which directly affect radio frequency subsystem power consumption. To detect and measure power consumption by a radio frequency subsystem, the radio frequency subsystem may implement current and voltage measurements of power that is directed to operate a radio frequency subsystem. The voltage and current provides power measurement in milliwatts. Energy consumed may be calculated from sample measurements by taking average power measured over a duration of transmission. In an alternative embodiment of power measurement, counter registers may be used to estimate power consumed during transmissions. Energy measurement may be a sampled during a count cycle. In this case, a sample energy measurement per count is multiplied into a count for operation of a radio subsystem. In this way, power consumption may be estimated.

The wireless adapters may be capable of connecting via a WLAN 140 or a macro-cellular network (WWAN) 150 and service provider 160 or 170 in a variety of the wireless standards as described above. Each of the wireless adapters for client mobile information handling systems 110, 120, and 130 are uniquely identified on network 100 via one or more unique identifiers permitting authentication and access. For example, the wireless device can each be identified by one or more Subscriber Identity Modules (SIM), one or more of a media access control (MAC) address, an Internet protocol (IP) address, a world wide name (WWN), or another unique identifier such as a user name and password, as needed or desired. Association of a user and a wireless interface module of a user information handling system may be made via communications across a networking control plane. For example, a user information handling system may be associated with a user via communication with a database such as Home Subscriber Server (HSS), Active Directory or similar database. This database may reside in the voice and packet core network 180, at a base station at 160 or 170, or elsewhere in the external network.

The wireless adapters may operate in accordance with any wireless data communication standards. To communicate with wireless local area network 140, standards including IEEE 802.11 WLAN standards, IEEE 802.15 WPAN standards, WWAN such as 3GPP or 3GPP2, or similar wireless standards may be used. The wireless LAN network 140 may provide connectivity via WiFi or WiGig for example. The wireless network 140 may have a wireless mesh architecture in accordance with mesh networks described by the above wireless data communications standards or similar standards. Wireless links 115, 125, and 135 may also connect to the external network via a WPAN, WLAN or similar wireless switched Ethernet connection. The wireless data communication standards set forth protocols for communications and routing via access point 145, as well as protocols for a variety of other operations. Other operations may include handoff of client devices moving between nodes, self-organizing of routing operations, or self-healing architectures in case of interruption.

Wireless links 115, 125, and 135 may connect to a macro-cellular wireless network 150 via one of the service providers 160 or 170. In the depicted example, service provider A 160 may provide wireless data connectivity via a 3G or 4G protocol. Service provider B 170 may offer connectivity via a 2.5G, 3G or 4G protocol. Any combination of macro-cellular wireless connectivity is possible for each or both of the service providers. The connection quality of service (QOS) and speed of wireless links 115, 125, and 135 may vary widely depending on several factors including the service provider bandwidth, the number of mobile information handling systems and users in a location, and other factors. Quality of service impacts energy consumption and efficiency of a mobile information handling system communicating wirelessly. Thus, selection of a wireless link may depend on assessment of the link radio frequency conditions. Radio frequency conditions for wireless links will evolve over time. Differences in wireless link QOS or efficiency will also vary minute-by-minute, hourly, daily, weekly or monthly or during even longer periods. Thus, assessment may need to be regular.

Wireless link conditions will vary depending on the type of service likely to be requested by the mobile information handling system. For example, voice communication may be most efficient on a 2G wireless protocol. Voice communication on 4G may be more costly in terms of time required for authentication and connectivity negotiation or in terms of transmission power requirements. Data services relating to messaging and SMTP email may have the lowest power cost on 2.5G protocols due to the simplest access barriers there. Higher level data services requiring greater wireless bandwidth may more efficiently use recently implemented protocols. For example, audio streaming may be optimal for 3G protocols. Video streaming and HTTP web browsing may be best suited to 4G protocols and much less efficient at lower protocols which are not designed to accommodate large data throughput.

As the protocols become more advanced, additional registration and initialization for data becomes costly from a processing and power consumption standpoint. This is balanced against the capabilities of the more advanced protocols to handle data transfers. More complicated communication protocols result in greater processing time and authentication/connection message exchange. More robust processor or controller operation and longer delays for transmitter or receiver circuits consume power. On the other hand, certain protocol advancements are designed to make data transfers quicker and more efficient. Thus for example, the 4G protocol may generally consume more power during operation than 2.5G for voice communications, but less power for high volume data transfers.

For this reason, the mobile information handling system operating context can play an important role in determining wireless link conditions and efficiency from a power consumption standpoint. Information about wireless link connection quality and capacity for a service to be used can be advantageous in optimizing communication channel selection. In most cases, transmission or reception via a macro-cellular network 150 base station at a service provider 160 or 170 will take more power than communication via WLAN such as WiFi. Among macro-cellular systems, energy consumption generally, but not in all circumstances, increases at each advancement of technology protocol from 2G to 4G. Plus, increased traffic levels on an advanced macro-cellular protocol may slow down in comparison to an older technology with less active traffic. Additional future macro-cellular protocols are contemplated as well. Those protocols may require additional energy demands of mobile information handling systems.

Factors impacting energy consumption include switching and signaling during communication access, setup, and authentication. Additional factors that impact energy consumption include control communications, latencies, transmission/reception, and switching for the wireless link. As described above, these factors can be specific to the type of wireless service being requested, whether voice, messaging, SMTP, Audio, Video, HTTP or other service types. It can also be specific to the mobile information handling system used. Certain protocols may not be available on some mobile information handling systems. In each instance, radio frequency transmission subsystems and controllers operate and consume device power. Based on these numerous factors, the system of the present embodiment may automatically switch between radio network technologies or service providers to optimize radio frequency conditions, traffic conditions, device power consumption, cost, or any of the above. Selection of a wireless service provider and technology protocol may generally depend on the optimal wireless technology used for a service requested, the radio frequency conditions of a link, traffic conditions for the wireless link, and availability of a link.

Information handling systems 110, 120, and 130 may connect to the network 140 or 150 via an initial default wireless link with one of the service providers 160, 170 or via a WPAN, Wifi, or WiGig connection. The default wireless link allows the mobile information handling systems 110, 120, and 130 to communicate with the network and in particular with a network broker server system 190. The network broker server system 190 and/or mobile information handling systems 110, 120, and 130 leverage information from a Wireless Intelligence Report system database 195 and may control access to a macro-cellular service provider or WLAN. Network broker server system 190 may be operated as a mobile virtual network operator (MVNO), a wireless service provider wholesaler, a mobile network operator (MNO), or similar type of network broker. The network broker server system 190 may have contractual bulk access to network services from a variety of mobile network operators or service providers. With this access to network services from multiple service providers, the network broker server system 190 may enable access or switch access for information handling systems 110, 120, and 130 among the available service providers. For example, network broker 190 may select among service providers 160 and 170 to information handling systems 110, 120, or 130. Information handling systems 110, 120, and 130 may be multiband capable via the wireless adapters therein. Antenna system frequency and radio protocols for a service provider may be adjusted by way of software programming of transmitter/receiver systems of the wireless adapters in mobile information handling systems 110, 120, and 130. Information handling systems 110, 120, and 130 may be multiband capable via these tunable antennas enabling a wireless adapter to target specific bands depending on the selected service provider and wireless protocol.

The network broker server system may also access aggregated Wireless Intelligence Report 195 about the performance of service providers 160 or 170 and the various wireless protocols they have made available. The aggregated Wireless Intelligence Reports 195 may be accumulated or crowd sourced from multiple handsets operating on a given network or networks. This feature will be described further below. In an alternative embodiment, the aggregated Wireless Intelligence Report 195 may be stored on the network broker server system itself. The selection of a service provider and protocol by the network broker server system 190 for an information handling system seeking a wireless link will be according to a recommendation received from a context aware radio resource management system agent running on the information handling system. The wireless link recommendation may be a weighted list of service provider options and protocols. It may be submitted by the context aware radio resource management system operating to the network broker server system 190 in the described embodiment. Alternatively, the context aware radio resource management system agent could run remotely on the network broker server systems or at a remote data center and use a default wireless link until an optimal wireless link is selected and the system is switched.

In an alternative embodiment, the radio frequency subsystems of a wireless adapter may contain individual subscriber identity module (SIM) profiles for each technology service provider and their available protocol. These multiple SIM profiles on the mobile information handling system may be provided by one broker such as an MVNO, or by multiple service providers. The system may have an application processor for the wireless adapter capable of switching between SIM profiles at the information handling system. The switching between SIM profiles and accessing the service providers may be conducted by information handling systems 110, 120, or 130. Thus, a wireless link recommendation from a context aware radio resource management system would not need to be transmitted to network broker server system 190. Information handling systems 110, 120, or 130 may select a SIM profile for a recommended service provider and protocol and seek direct access. Nonetheless, billing and other coordination of SIM profile options may be managed by a broker such as an MVNO. The context aware radio resource management system is described further below.

Figure 2:
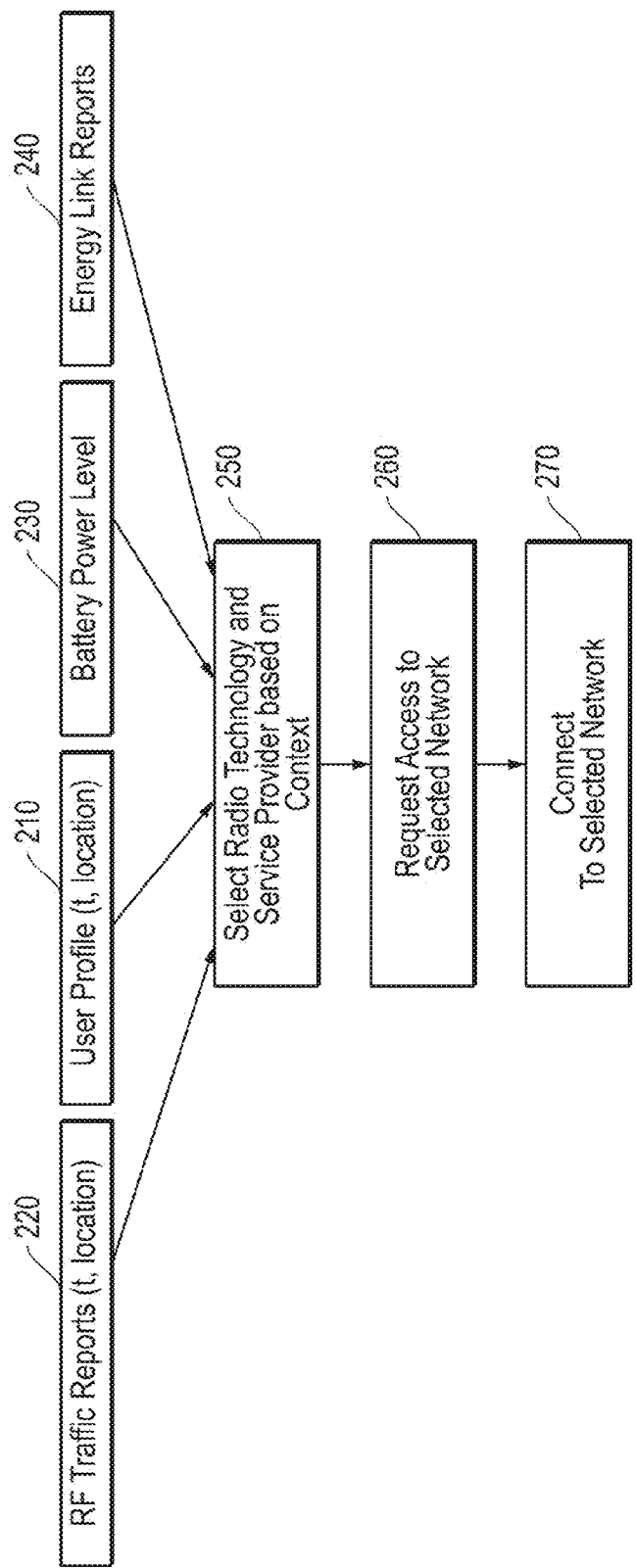
FIG. 2 is a flow diagram illustrating a method of connecting to a wireless network using a context aware radio resource management system according to an embodiment of the present disclosure.

FIG. 2 illustrates a context aware radio resource management method for use in selecting a network and technology within wireless network 100 at a given location. Several factors are assessed by the context aware radio resource management method in selecting a radio technology and a service provider. A software agent is deployed at a mobile information handling system or elsewhere in the network for executing the context aware radio resource management method. At step 210, the context aware radio resource management system software agent obtains user profile data. The user profile data establishes an approximate cyclostationary usage pattern of the mobile information handling system. The time of day, location, types of usage, and usage percentages during a sample time interval are example factors included in the user profile data. This user profile data also may include a confidence of the estimate. This may be a statistical measurement of a mean and standard deviation for a set of data. Alternatively, the confidence of estimate may involve a goodness of fit metric to an expected set of values. Alternative statistical analysis may be performed on the user profile data to provide a confidence of the estimate.

At step 220, the context aware radio resource management system receives wireless link radio frequency broadband traffic reports. For location and time, available radio technologies and service providers are listed. The reports contain data relating to location, time and a radio frequency profile of given radio technologies for the available service providers. The data may also include an associated confidence of estimate. The wireless link radio frequency profile may combine recent reports, historical traffic reports, as well as data measured via an active device radio frequency scan. In order to minimize a mobile information handling system battery power consumed, radio frequency broadband traffic reports from the network may only be requested or sent when a service provider network or a mobile information handling system detects a significant change in signal quality or the network broker server detects that the local crowd source information is out of date.

The context aware radio resource management system receives battery power level data at step 230 from an intelligent battery management system of the mobile information handling system. The battery power level input may determine that certain wireless communication protocols are too costly in terms of power. Below a defined battery level threshold, the context aware radio resource management system may disable the most advanced protocols to save energy. For example, with only 10% battery power remaining, the context aware system may recommend to a user to disable high power consuming protocols such as 4G. The option may be given to the user, or automatic shut down of the radio frequency subsystem may take place. In a further example, the context aware system may recommend or shut down 3.5G at 5% remaining battery power. Any threshold levels may be set to trigger recommended shut down. This data provides the context aware radio resource management system with an ability to manage the mobile information handling system power consumption when battery levels are low. The context aware radio resource management system may switch wireless protocols being when receiving a shut down recommendation. The switching may happen with a continuous connection to the same service provider.

The intelligent battery power management may also determine which services or protocols are unavailable at a given location. This information may come in part from radio frequency profile data in the radio frequency broadband traffic reports. In that case, the radio frequency subsystem transmitters, receivers, and controllers associated with unavailable protocols may be turned off by the context aware radio resource management system. For example, if no 4G WWAN is detected, the radios capable of communicating with these protocols may be turned off in the mobile information handling system. As before, the option may be recommended to the user of the mobile information handling system before shutting a subsystem down.

Step 240 depicts that a variation of the mobile broadband traffic reports may be used by the context aware radio resource management system. The variation is a link energy consumption report. These energy link reports contain data relating to time, location and radio frequency profile information similar to the radio frequency broadband traffic reports 220. In addition, measurements of energy consumed during use of a specified wireless link for a specified wireless service type is reported. The energy link data profile matrix can provide more detailed information above the mobile broadband radio frequency traffic reports. As with other input factors, a confidence of estimate associated with this data may be included. The energy link report data may combine recent energy link profiles, historical energy link reports, and measurements through mobile information handling system scans during operation.

At method step 250, the context aware radio resource management system receives the user profile data 210, the wireless link radio frequency broadband traffic reports 220, and battery power level data 230. Alternatively, the energy link reports 240 may be received as a variation of the wireless link radio frequency broadband traffic reports 220. These inputs are assessed by the context aware radio resource management system software agent at 250. The context aware radio resource management system software agent determines the optimal radio frequency technology protocol and service provider to be used. This determination is based, at least in part, on some subset of data in the input reports. Also, the settings such as what protocols are available, which protocols have been shut down, or what power is required to transmit on a given protocol are determined for the mobile information handling system.

In one embodiment, the wireless link assessment 250 may result in a ranked list of service providers. Using user profile reports 210 and radio frequency link reports 220, each service provider may be given an overall rank as follows:

Service Provider Rating $(j) = \Sigma_{i=1 \ to \ k}$ (User Profile by Technology*Link Rating), where $i$=a technology index, $j$=service provider index, and $k$=the number of wireless technologies.

The service providers can be ranked by this score. For a matrix of link protocols=[2G, 2.5G, 3G, 3.5G, 4G], an example user profile by technology may result in the following matrix (30%, 25%, 15%, 30%, 0%). The user profile shows the anticipated protocol usage score from a location and timeperiod. A Link Rating (j) may result in the following matrix (70%, 80%, 95%, 90%, 30%). The link rating shows a quality of service score by protocol for a service provider at a location and time. The service provider rating for a user profile in this example would result in 0.8225. Altering the weight of factors may increase or decrease the relevance of certain protocols depending on the change to the calculations. Either the user profile scores or the link ratings may change the calculations of the scores assigned there. This is described further below. The above values serve only as an example.

Battery power levels 230, energy link reports 240, and additional factors, such as subscriber cost of wireless link usage, may also be assessed to select a wireless link. Subscriber cost or settings may influence the determination by weighting protocol options and influence the scoring described below. Alternatively, settings or subscriber cost may be used to mask out protocol options altogether.

The selection of a wireless link by the context aware radio resource management system may depend on the factors and settings described above. For example, if optimal speed of connection is the goal with less consideration of power consumption, the weight assigned by the context aware system to input data may be influenced. This may be the case if the context aware resource management system detects a connection to an AC power source. User profile data 210 showing usage and the wireless link radio frequency broadband traffic reports 220 indicating link quality and capacity will be more heavily weighted. Energy consumption data may be less heavily weighed. If on the other hand, lower power consumption and long battery life are optimal considerations, battery power level data 230 and the energy link reports 240 may be more heavily weighted. Any combination of weighting involving anticipated usage, radio frequency channel quality, battery power levels, or efficient power consumption may be used in the present embodiment.

Upon determination of an optimal link or links, the context aware radio resource management system provides a command to select a preferred wireless link protocol and service provider. In an alternative embodiment, a list is created providing a preferred set of wireless links and protocols. The context aware radio resource management system may also list wireless links in rank order as described above.

At method step 260, a request is made for access to the selected network. The context aware radio resource management system transmits a command or a list of selected wireless link providers and protocols to a network broker server. The mobile information handling system contacts the network broker server via a default wireless link made available to it. With the weighted list, the network broker server may negotiate access to preferred service providers and protocols for the location of the mobile information handling system. Alternatively, the context aware radio resource management system provides a list or command to an application processor controlling SIM profile selection within the mobile information handling system. Then the wireless adapter negotiates access to a preferred service provider and selects a protocol.

At step 270, if the access request is accepted by the service provider, the mobile information handling system is connected to the selected service provider and wireless protocol. If access is declined, the network broker server or wireless adapter will request access to another preferred protocol and service provider in the weighted list received from the context aware radio resource management system. If the list is in rank order, then one embodiment may turn to the next ranked protocol and service provider. This repeats until a satisfactory wireless link is found and access made for the mobile information handling system.

Figure 3:
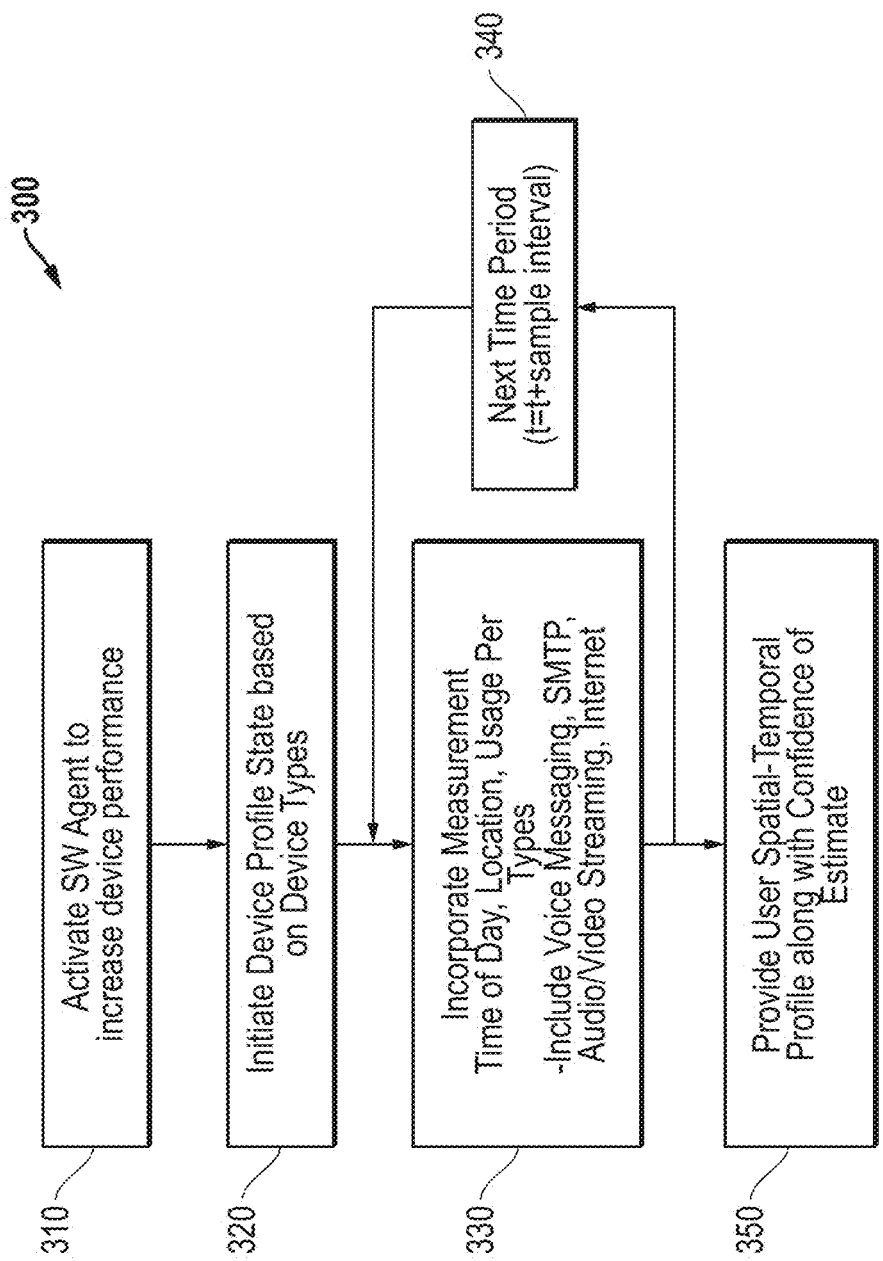
FIG. 3 is a flow diagram illustrating a method of mobile information handling system usage profiling according to an embodiment of the present disclosure.

FIG. 3 illustrates a method 300 for generating an end-user profile in the context aware radio resource management system. In the first step 310, the context aware radio resource management system software agent is started to optimize device performance in selecting a wireless link. At step 320, the context aware radio resource management system software agent initiates a baseline device profile state. The device profile state reflects expected usage for the mobile information handling system. It includes various usage service types. Example usage types may include voice, audio streaming, video streaming, internet usage, email communication, SMS or other messaging. A previous user data profile collected for the operation of the mobile information handling system may serve as the baseline device profile. Such a profile is specific to the location of the device and to a time slice during which operation is being optimized. Locations may be assigned to geographic zones such as a campus, city, borough, county, etc. Time may be assigned to defined timeperiods during a day but may differ across days of the week. This zoning and time definition is optional but will help control the number of different user profiles generated.

In one embodiment, a set default user profile may be used as a baseline. For example, the client service profile may assume SMS messaging consumes 10% of device usage, voice communications consume 30%, video streaming consumes 10% of usage, audio streaming consumes 15% of usage, SMTP email consumes 10%, and internet activity consumes 25%. This baseline state may be specific to the mobile information handling system type. For example, the mobile information handling system may be geared toward usage on a certain network protocol. For example, certain systems may be optimized to operate on a 3G or 4G network. Additionally, a default service provider and wireless protocol may generally be assigned to the mobile information handling system. This default wireless link may affect or set the baseline profile state.

At step 330, the context aware radio resource management system may initiate operational measurements according to time of day, location of mobile information handling system, and usage levels for various usage types. The usage data measurements may be taken during sample intervals. For example, during a time period from a specific location zone, the context aware radio resource management system may monitor operation of the mobile information handling system. It will measure the dwell time or use percentage of each type of service. This can include measuring minutes used or number of calls made for voice service. It can measure bytes transferred or number of requests made for video streaming or audio streaming. It may measure the number of messages sent and received or bytes transferred for SMTP, SMS, or similar messaging. The context aware radio resource management system can also measure the data requests and responses or data volumes exchanged in internet accesses. At each sample interval, the available service providers and available wireless link protocols may be determined as well.

The results of the measurements are incorporated into a user profile at step 330. Rather than strictly relying of total data volumes or number of requests, the measurements may be scaled or normalized to reflect a percentage of service usage. This normalized scoring permits comparison. The normalization may be scaled to permit scores of usage reflecting importance or frequency of access to the service types. For example, while audio/video streaming may take a large amount of data, usage may be uncommon. For the same timeperiod, the voice service usage or SMTP messaging may be substantially more frequent but may not transfer as much data volume. Therefore, service recommendations may be better scaled toward frequency of accesses rather than total data throughput volumes. If on the other hand video streaming is a daily occurrence, even if only one request occurs at that time period, then scaling may lean toward total data volume. In this case, normalization scaling in favor of data throughput volume may more accurately reflect the usage.

The use or usage percentage may be measured and scored according to the preferred parameters set in the context aware radio resource management system. It may also be averaged with the baseline default or historical user profile state if so desired. For example, previously measured usage data for a location zone and timeperiod may provide higher data confidence if averaged into measured data.

Measurements may be repeatedly taken in later sample intervals at step 340. Such measurements may be conducted throughout an entire day and over the course of several days or longer. The multiple sample measurements of the mobile information handling system usage comprise a spatial-temporal user profile. The spatial-temporal user profile may have an associated confidence estimate. At step 350, the spatial-temporal user profile and any confidence estimate will be stored either at the mobile information handling system or elsewhere in an available database. The spatial-temporal user profile for the mobile information handling system usage assists in selection of radio frequency links for given times and location zones. The user profile may predict the predominantly used combination of services typical of the mobile information handling system during a timeperiod or from a certain location. The predicted service usage assists in selecting an optimal service provider and radio frequency protocol. The spatial-temporal user profile information will be stored in the mobile information handling system to protect end-user privacy information To apply this data to selection of a wireless service provider and protocol, the usage percentage levels are mapped to service protocols available to a mobile information handling system. The mapping of use percentages to a protocol may involve assigning the use percentage for a service to the lowest power consuming protocol available for a usage type. In other words, the service type usage score is mapped to the technology protocol most efficient for that service type. For example, voice communication usage may be assigned to a 2G protocol whereas audio or video streaming may be assigned to 4G. These energy efficiency rules are stored as part of system parameters. These parameters are used to map services to optimal wireless technology. The parameters may also be adjusted as a function of energy state or battery power levels of the mobile information handling system. The parameters may also be specific to the make or model of the mobile information handling system and its capabilities in processing, memory, radio frequency transmission systems and other features.

Once the usage levels are measured and scaled according to anticipated importance of data throughput versus frequency of access, the result may score messaging at 20% of usage, voice at 30% of usage, video at 10% of usage, audio at 15% of usage, SMTP at 5% of usage, and internet at 20% of usage. For optimizing minimal power consumption, each service usage is mapped to a service protocol. For example, voice may consume the least power on a 2G network. If 2G cannot accommodate video streaming, it may be eliminated however. The voice score is associated with the most efficient choice available. If video streaming is very infrequent at less than 5%, then elimination of 2G protocol may be disregarded. Should the rare video streaming service request occur, the cost of switching protocols may be worthwhile at that time. Switching protocols may even occur within one service provider to minimize cost of access, negotiation, authentication, and switching with a different service provider.

In the present example, messaging and SMTP email are optimal at 2.5G. The email usage score is then mapped to 2.5G. 3G may consume more power, but also may be determined to provide audio streaming services most efficiently. Thus, the audio streaming usage score is mapped to 3G. Internet access and video streaming may be most efficient in a 4G protocol and thus mapped to this protocol. If 4G is unavailable, then 3.5G may be selected instead if it is the next most efficient protocol level.

The mapping will result in a service profile of protocol technology assigned according to optimal power consumption efficiency for the services anticipated for a mobile information handling system. For example, 2G may be weighted with a value of 30% as optimal for voice usage. 2.5 G may be weighted at 25% as optimal for SMS messaging and SMTP email messaging. 3G may be weighted at 15% as optimal for audio streaming usage. And 3.5G may be weighted at 30% for video streaming and http internet access in the case that 4G is unavailable. For a matrix of link protocols=[2G, 2.5G, 3G, 3.5G, 4G], a user profile by technology may result in the following example matrix (30%, 25%, 15%, 30%, 0%). This spatial-temporal user profile data is then utilized by the context aware radio resource management system alone or in combination with other profile reports shown in FIG. 2 to select a wireless link.

Figure 4:
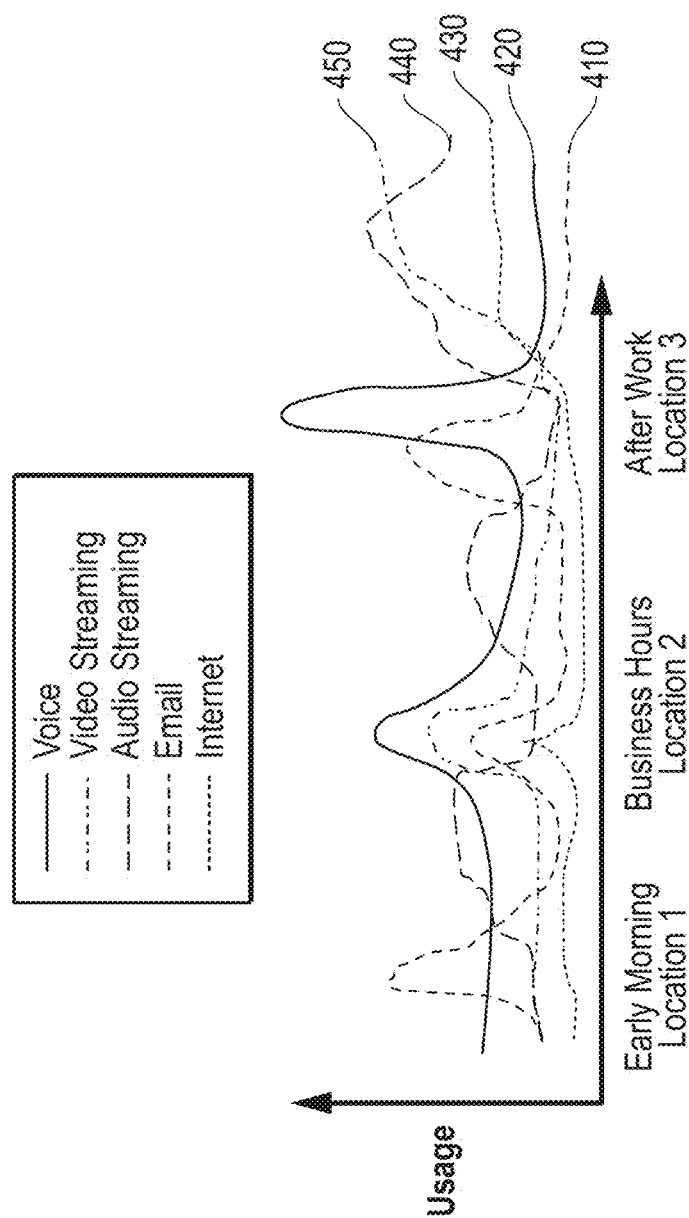
FIG. 4 is a chart illustrating an example usage profile of a mobile information handling system according to an embodiment of the present disclosure.

FIG. 4 illustrates a graphical example of spatial-temporal user trends for a mobile information handling system. As shown in FIG. 4, user trend behavior measurements are shown as a function of time and location. Five usage types are illustrated in this example, voice, video streaming, audio streaming, email, and internet usage. Usage amounts are shown along the x-axis. The y-axis depicts time and various locations. In this example, three locations and timeperiods are defined, though more or fewer could exist. Those timeperiods are early morning usage at Location 1, business hours usage at Location 2, and after work hours at Location 3. Each general timeperiod may be comprised of multiple time slices with separate data samples. The mobile information handling system may apply a curve fitting approach to the user profile data to compress information associated with a level of use per type of service per unit of time. An n-order polynomial approach may be used to reduce information to N parameters.

Email usage is depicted in trace 410. Voice bandwidth usage is depicted in trace 420. Internet usage is depicted in trace 430. Audio streaming usage is depicted in trace 440. And video streaming usage is depicted in trace 450. In many cases, the user profile data can be expected to be cyclostationary. In other words, the usage trends repeat themselves. For example, usage may repeat itself daily during a business week. In the example of FIG. 4, voice bandwidth usage 420 increases mid-day during business hours at location 2 during lunch. Voice bandwidth consumption 420 will again increase during after work hours at location 3. This may include increasing during a commute home or upon returning home. Similarly, trends in email usage 410 may show peaks at all three locations with lower bandwidth usage trends arising during non-break business hours at location 2 and late in the evening after work at location 3. Thus, despite variability in these usage schedules, some cyclostationary consistency can be established. For this reason, timeperiod data may be averaged for weekdays or may be specific to Wednesdays depending on the trends. Variability may be accounted for with confidence estimates on the data.

Figure 5:
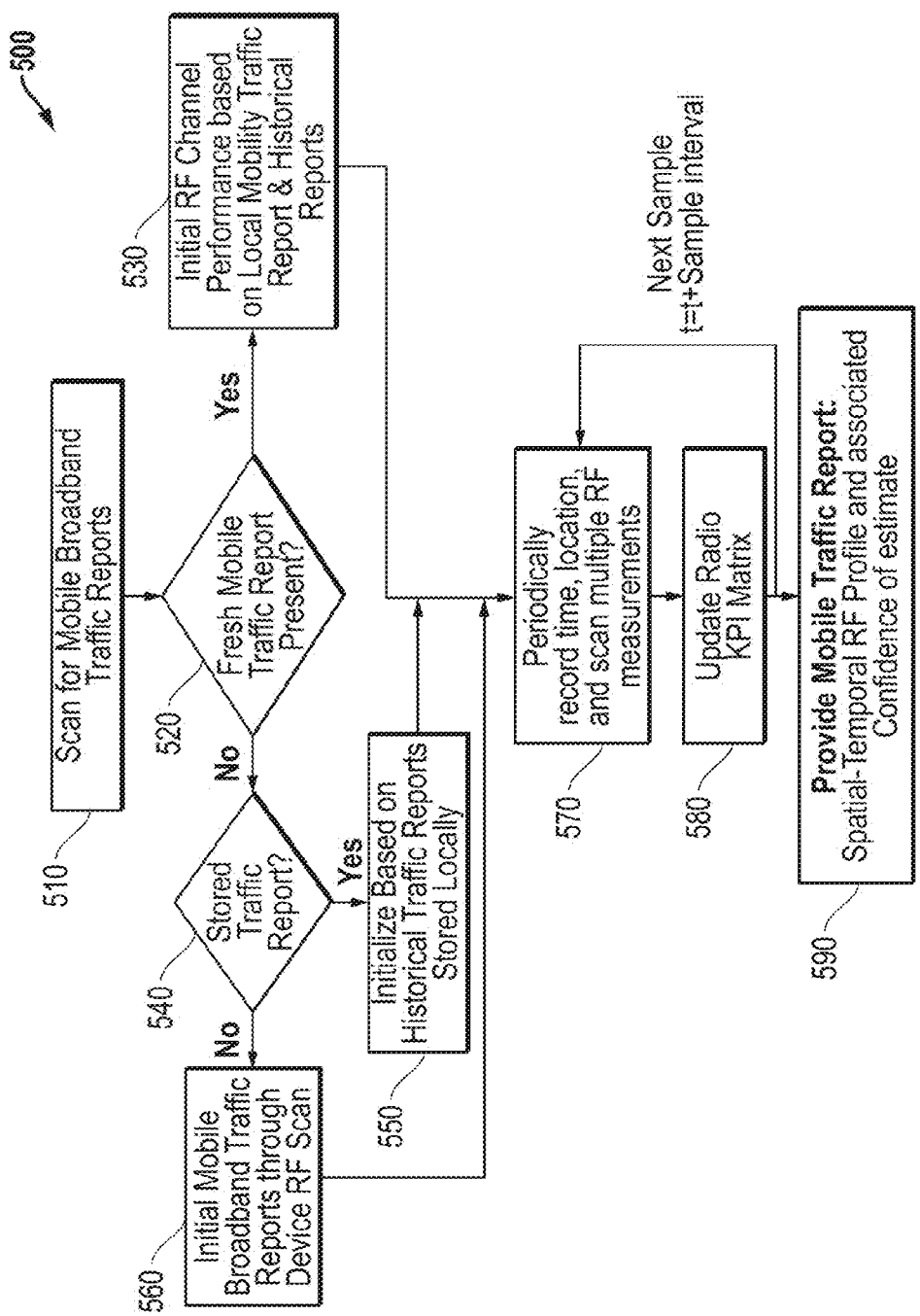
FIG. 5 is a flow diagram illustrating a method for wireless link traffic reporting according to an embodiment of the present disclosure.

FIG. 5 shows a method 500 for establishing a mobile broadband traffic report for a wireless link for wireless links. The mobile broadband traffic report partially comprises a spatial-temporal radio frequency profile for the wireless links. The systems begins with a baseline mobile broadband report available from a network broker system or available from cooperative service providers if no previously measured data is available. By way of example, baseline data may be drawn from available wireless coverage maps.

Key performance indicators (KPI) comprise a spatial-temporal radio frequency profile. Data such as received signal strength (RSSI), signal-to-noise ratios (SNR), or signal to interference ratios (SIR) may be relevant channel quality indicators in a KPI matrix. Other data, may include data throughput speeds and communication latencies. One or more of these performance indicators may be used to compute a link rating for a wireless link. Baseline reports rely on estimated values. For example using baseline estimated received signal strength indicators (RSSI), a link rating may be computed as follows:

Link Rating $(i,j)$=MAX(MIN(100%, (Estimated $RSSI$ Signal Carrier−Minimum Signal)/Max $RSSI$ signal−Minimum $RSSI$ signal, 0%), where $i$ is a technology index and $j$ is a service provider index.

A maximum RSSI level may be defined in a technology protocol, for example as −70 dBm. The minimum RSSI level may be defined as well, for example at −110 dBm. RSSI is not the only key performance indicator that may be used to compute link ratings. Link rating may be based on different key performance indicator values besides received signal strength. Alternatively, multiple key performance indicator values may be used in the computation of a link rating.

A link rating matrix is established by link protocols for a service provider. For a matrix of [2G, 2.5G, 3G, 3.5G, 4G], the baseline Link Rating (j) computation may result in (70%, 80%, 95%, 90%, 30%). 100% indicates best signal link quality and 0% indicates a signal quality below a minimum acceptable level. The Link Rating (j) evaluates a service provider overall. The context aware radio resource management system may use the link rating scores to evaluate the optimal wireless service providers and available protocols for the anticipated usages. Once a service provider is selected, the context aware radio resource management system may switch between protocols within one service provider depending on changes in usage. Thus, the link rating protocol matrix can assist in selecting a service provider with the best scores in multiple protocols.

At block 510, a context aware radio resource management system operating on a mobile information handling system may scan for wireless link mobile broadband traffic reports fitting a time and location zone for operation. Wireless link mobile broadband traffic reports may be retrieved from a central server database in the wireless networks 140 and 150. Alternatively they may be located elsewhere in a database such as at a network broker server system. The baseline report may be supplemented or superseded by any fresh or historical mobile traffic reports to assist in selecting a service provider and protocol. Recent or historic radio frequency profiles for timeperiod and location zone may be used to update or supplement the wireless link mobile broadband traffic reports. More recent data may be of greater relevance however. For example, the link ratings in a radio frequency profile may utilize recently measured RSSI values instead of estimated values.

Mobile broadband traffic reports are aggregated via crowd sourcing. They may be categorized by location zone and have time and date stamps to identify freshness. Crowd sourcing of information will enhance the availability of accurate data for location zones and times of mobile information handling system operation. For example, if a mobile information handling system makes a request for a fresh mobile broadband traffic report, the central server database may have reports from other mobile information handling systems with recent timestamps. Alternatively, the central server database may make a request for a recent mobile broadband traffic report from mobile information handling systems in the same location. Whether via recent storage in the central database or via a recent request of fresh crowd sourced mobile broadband traffic reports, such a report may avoid the need for the mobile information handling system to conduct a radio frequency scan itself.

Crowd sourcing mobile broadband traffic reports for locations and times provides a higher chance that a current mobile broadband traffic report for a location is available. It also increases the available data points providing greater certainty and reliability of data. Part of the benefit of crowd sourcing may also involve performing a hysteresis analysis on the data coming from multiple mobile information handling systems to determine trends in wireless link selection. When a wireless link is reported having low traffic and good radio frequency conditions, traffic from systems using the context aware radio resource management system will elect that wireless link. If a large part of the crowd of mobile information handling systems begin to pile onto whichever wireless link is reported to have the best available bandwidth, that link will slow down and underperform. The mobile broadband traffic reports account for this by conducting a hysteresis analysis. If a large number of users begin to select this wireless link, then the method for generating mobile broadband traffic reports accounts for this traffic and alters the recommended wireless links. For example, a second best option may be recommended as optimal for traffic and radio frequency conditions instead. Each crowd sourced mobile broadband traffic report identifies its selected link. A count of these selections can be compared to a threshold rate level of selections for a given link. If the rate of selections exceeds the threshold for a link, then the recommendation may be altered.

At block 520, the method determines whether a fresh mobile broadband traffic report is available for the location of the mobile information handling system. If so, a fresh mobile broadband traffic report is retrieved from a central server database. At 530, the method assesses the fresh mobile broadband traffic reports and any available historical mobile broadband traffic reports. Historical mobile broadband traffic reports may be stored locally for the mobile information handling system or received from a central server database. Assessment of both fresh and historical data is used to determine one or more optimal wireless links at step 530. The combination of fresh and historical information provides a radio frequency channel performance assessment of the wireless links. While fresh report data may be weighted more, historical data may add additional depth of data. The context aware radio resource management system elects a wireless link based, at least in part, on the radio frequency channel performance profile as described in FIG. 2.

If no fresh mobile broadband traffic reports are available at step 520, the method seeks stored historical mobile broadband traffic reports from the central server database at step 540. Depending upon the age of these historical mobile broadband traffic reports and the estimated confidence associated with that data, the method will establish a radio frequency channel performance profile based on historical mobile broadband traffic reports at step 550. If there are no reliable historical mobile broadband traffic reports recent enough to base an assessment upon, the context aware radio resource management system initiates a mobile information handling system radio frequency scan. This scan collects data regarding possible wireless links at step 560. This radio frequency scan consumes power and processor resources so should be used sparingly, however it provides up-to-date key performance indicators (KPI) for a new radio frequency profile to be used in a mobile broadband traffic report. Based upon this new mobile broadband traffic report, the system provides a wireless link performance profile to be used by the context aware radio resource management system.

The scan or test of radio frequency links may be conducted by the context aware radio resource management system. As a first measure, received signal strength and bandwidth availability for a service provider and a protocol are determined. Then a test of radio frequency data capacity is made. This can test upload and download performance for each service provider and protocol. For example, a standard test data volume may be sent via a wireless link to a server location at the service provider. Similarly, a test data volume may be received from a server location by the mobile information handling system via the wireless link. Latency of response, upload and download speed or throughput can then be measured for the service provider and protocol. The data is associated with a location zone and stamped with a time and date. The type of transmitter/receiver or mobile information handling system may also be recorded. This data set provides a wireless link radio frequency profile that may become part of a mobile broadband traffic report. Upon measuring this data for a location, the report may be shared or published by the context aware radio resource management system from the mobile information handling system.

Once a radio frequency channel performance profile is submitted to the context aware radio resource management system and a wireless link selected, the mobile information handling system may periodically scan multiple wireless links or measure the selected wireless link at step 570. The system may conduct testing to determine the capacity of a link during operation. In order to minimize radio communication and use of resources, the network broker may be used to proactively notify a mobile information handling system if a wireless link selection was made using an obsolete crowd-sourced data source. This network broker server system may compare time stamps of crowd-sourced data used for wireless link selection or ranking with current time stamps of network-stored crowd-sourced material.

Testing is similar to the testing described above. Additionally, context aware radio resource management system may assess the quality of the wireless link being used. In addition to the capacity above, metrics such as bit error rate (BER) and signal-to-interference metrics may be assessed. Bit error rate is the ratio of error bits to total bits sent across a wireless link. It is a metric illustrating a signal to noise ratio which can define the quality of a radio connection for a wireless link. A bit error rate may be a comparison of a sent test stream of data by a transmitter with what is received by a receiver. The bit error rate can be tested by a bit error rate tester in software which transmits a known bit pattern to or from the mobile information handling system. Pre-error correction errors are counted. A signal-to-interference ratio may also be measured. Such a measurement is based on the power levels for signal transmission (e.g., per bit) relative to interference levels in the received signal. Packet error rate, signal-to-noise measurement, or other signal quality testing is also contemplated.

At step 580, the periodic wireless link scan updates a wireless key performance indicator (KPI) data matrix stored on the mobile information handling system. The KPI matrix establishes the spatial-temporal radio frequency profile and comprises the data for the mobile broadband traffic report. The updated data is time or date stamped to establish its freshness. The system may repeat the periodic wireless link scans and update the KPI matrix for future intervals of time.

At step 590, the spatial-temporal radio frequency profile of the current mobile broadband traffic report and any associated confidence of estimate may optionally be advertised to the central server database for use by other mobile information handling systems. Thus, the mobile information handling system may provide its contribution to the crowd sourcing data for a time and location of wireless link access. Alternatively, the mobile information handling system may store the mobile broadband traffic report locally and respond to requests from a central server database for the information.

Figure 6:
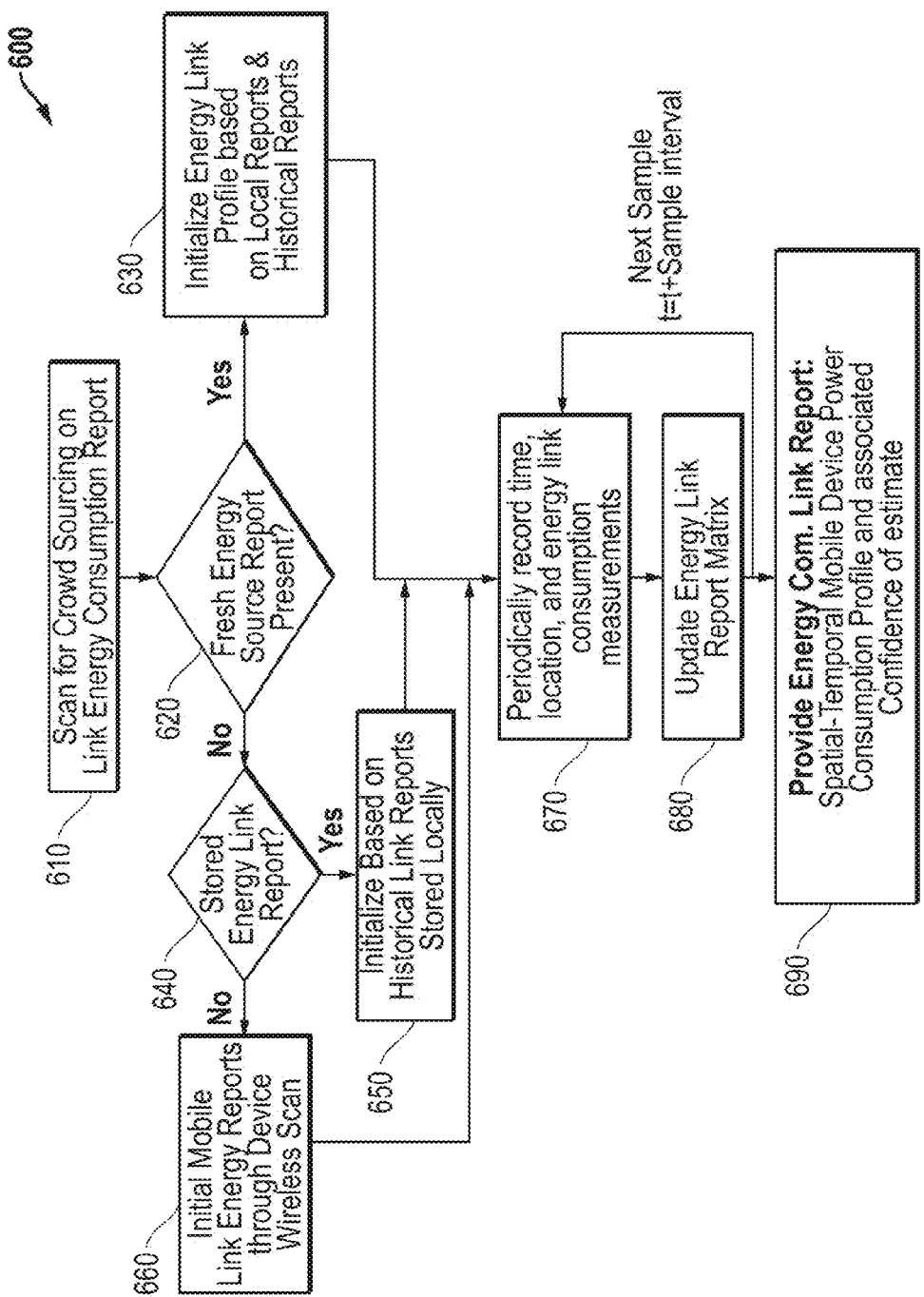
FIG. 6 is a flow diagram illustrating a method for wireless link energy consumption reporting according to an embodiment of the present disclosure.

FIG. 6 shows a method 600 for profiling link energy consumption for wireless communication links. This is an alternative embodiment to the method of FIG. 5 for assessing spatial-temporal radio frequency profiles for wireless links. In addition to assessment of link capacity and quality as in the method of FIG. 5, the system additionally assesses data for device energy consumption relating to various services. In this embodiment, the context aware radio resource management system prepares and delivers an energy link consumption report. The energy link consumption report provides data on power consumed by a mobile information handling system while performing certain tasks on a wireless link at a location. Energy link consumption reports contain data indicating how many joules of energy are consumed during sending SMTP emails, sending SMS messages, conducting voice communications, accessing internet services, streaming audio or video, or other uses of mobile information handling systems. This data amounts to another key performance indicator (KPI) in addition to capacity or link quality data for a wireless link. The context aware radio resource management system can measure and utilize some or all data such as link capacity, link quality, and energy consumption in determining preferred wireless links. Link ratings may be calculated similarly to the above description using link energy consumption data. If energy consumption data is unavailable however, the system will function with the mobile broadband traffic reports described in FIG. 5.

Scans for energy consumption information are described further below. The energy link consumption reports retrieved or compiled for the method of FIG. 6 may also record the specific type of information handling system in one embodiment. With a large number of available reports, for example crowd sourced data, filtering for tailored energy consumption information based on a make and model of a mobile information handling system may better account for model-specific variations in wireless operation. As before, the energy link consumption reports are location specific and time specific. Radio frequency scans and energy consumption measurements may consume resources, thus the method begins by searching for available link energy consumption reports.

In step 610, the context aware radio resource management system of a mobile information handling system may scan for energy link consumption reports for the device and location of operation. The scan searches for fresh, crowd sourced energy link consumption reports among data available from a central server database in the wireless networks 140 and 150 or located elsewhere. As described above, crowd sourcing of energy consumption information will enhance the availability of accurate and current data for locations and times of mobile information handling system operation. A request for a fresh energy link consumption report may be submitted to the central server database or some other database storing such reports. The request may be location specific, timeperiod specific, device specific or any combination of the above. Freshness may be a parameter defined by timestamp data on a report submission. For example, reports submitted for a location on the same day or within the past 24 hours may be qualified as fresh. Any limitation of time on freshness may be used. If a timeperiod during a day is split up on an hourly bases, a fresh report may be one that was submitted within the current or previous hour of the same day. Although a different timeperiod for recent radio frequency traffic in a location may also be used by the present embodiment.

In an alternative embodiment, data and reports may not be stored at a central server database, or only a subset of available data may be stored there. The context aware radio resource management system may make a request for a recent energy link consumption report from similarly situated mobile information handling systems at the same location. This request may come indirectly via a request from the central server. Whether via reports stored in the central database or via a recent request for fresh crowd sourced energy link consumption reports, a scan for pre-existing reports may avoid the need for the mobile information handling system to conduct an energy consumption survey itself.

As with the broadband traffic reports for certain locations, part of the crowd sourcing of energy link consumption report data may also involve performing a hysteresis analysis on the data. Analyzing data from multiple mobile information handling systems may determine trends in wireless link selection happening at a location. If many mobile information handling systems at a location begin to select one preferred wireless link, that link may slow down and underperform. The energy link consumption reports account for this crowding onto a link with the hysteresis analysis. If a large number of users begin to select a given wireless link, then the method for generating energy link consumption reports accounts for this factor. The method may alter which links are recommended or in what order they are recommended.

At block 620, the method may determine that a fresh energy link consumption report is available for the location of the mobile information handling system. It does so by receiving an acknowledgment or a fresh energy link consumption report from a central server database. At 630, the method assesses the fresh energy link consumption reports. The method may also retrieve and include historical energy link consumption reports, if available. Historical energy link consumption reports may be stored locally for the mobile information handling system or received at the mobile information handling system from a central server database. These historical reports may not meet the freshness limitation, but may prove useful. Although historical reports may not be weighted as heavily as a fresh report, the historical reports may still add value or depth to the data available for a given location and time.

Assessment of energy link consumption reports are used to suggest a wireless link at step 630. If conservation of battery power is a preeminent consideration, a link having the least power consumption for wireless services may be recommended. In embodiments where a weighted list of available links is provided, selection by least-power-consumed on average may be used. The context aware radio resource management system may also utilize user profile information to recommend links based on the most likely used wireless service or combination of services at a location or during a timeperiod. The links having the least power consumption for a heavily used service or services by the mobile information handling system will be recommended.

Least-power-consumed may not always equate with recommending a wireless link with the greatest capacity or quality however. Although less energy consumption often tracks the quality of a link, link quality may vastly improve as greater power is used in transmission. For example, higher power consuming transmission may be used by a transmitter to improve signal to noise ratio and, therefore, more power yields a higher quality link. In this case, the higher power transmission may be preferred. In certain embodiments, detection by a mobile information handling system of the battery state may determine the priority used. In that case, the context aware radio resource management system analyzes the energy link report in combination with a battery power level assessment in determining recommended wireless links. In another alternative, the mobile information handling system may detect connection to an AC power source to set the priority relating to energy link consumption versus radio frequency capacity and quality. Thus, the context aware radio resource management system elects a wireless link based at least in part on the mobile information handling system power consumption assessment and other factors as described in FIG. 2.

If no fresh energy link consumption reports are available at step 620, the method seeks stored historical energy link consumption reports from the central server database at step 640. Depending upon the age of these historical energy link consumption reports and the estimated confidence associated with that data, the method will establish a mobile information handling system power consumption assessment on historical energy link consumption reports stored locally or received locally at step 650. A link may be recommend based upon that report. Similar considerations to the above may be taken into account.

If there are no historical energy link consumption reports recent enough to base an assessment upon, the context aware radio resource management system initiates a mobile information handling system energy link power scan to collect data regarding possible wireless links at step 660. Conducting this energy link power scan consumes power and processor resources, however it provides up-to-date information for a new energy link consumption report. Based upon this new energy link consumption report, the system provides a mobile information handling system power consumption assessment to be used to select a wireless link by the context aware radio resource management system.

A scan or test of radio frequency and energy consumption of links may be conducted by the context aware radio resource management system. Some measures are similar to the method of FIG. 5 to generate a radio frequency link profile. As a first measure, signal strength and bandwidth availability for a service provider and an available protocol is determined. Then a test of radio frequency channel capacity is made. This can test upload and download performance for each service provider and protocol. For example, a standard test data volume may be sent via a wireless link to a server location at the service provider. Similarly, a test data volume may be received from a server location by the mobile information handling system via the wireless link. Latency of response, upload and download speed or throughput can then be measured for the service provider and protocol. In addition, the context aware radio resource management system may measure the energy consumed in transmitting or receiving the test data volume. The power consumed may therefore be expressed in Joules or converted into a Joules/bit or Joules/byte value based on the standard test data volume. The data is associated with a location and time and it is time and date-stamped. The type of transmitter/receiver or mobile information handling system may also be recorded. This energy consumption data may be included in a wireless link radio frequency profile and become part of a mobile broadband traffic report. Upon measuring this data for a location, the report may be shared or published by the context aware radio resource management system from the mobile information handling system.

Once a mobile information handling system power consumption assessment is submitted to the context aware radio resource management system and a wireless link selected, the mobile information handling system may conduct an ongoing mobile information handling system power consumption scan for the wireless link or links being used. The context aware radio resource management system periodically measures time, location, radio frequency profile data and energy link consumption data for the selected wireless link or links at step 670. The data may be measured during operation of the mobile information handling system. Radio frequency profile measurements such as signal level, capacity, and signal quality may be measured in accordance to the description above for FIG. 5. Power consumption measurements for the mobile information handling system communications on the wireless link are also measured.

Power consumption measurements may be conducted that are specific to the mobile services used. For example, energy consumption during voice communications may be measured. The amount of power, for example in milliwatts or Joules, may be expressed as a measurement per voice minutes consumed. Power measurements of a radio frequency subsystem from the start of a conversation to the end of a conversation may be measured as described above. The context aware radio resource management system associates this power consumption measurement with the service being utilized. Similarly, for data transferred during internet accesses, power consumption may be measured relative to data volumes uploaded or downloaded. The power would be measured at the active radio frequency subsystem beginning during a download and recording the amount of data or time of a download as well. A power-per-byte or similar measurement may be recorded in an energy link data matrix for that location and time of an internet access. Alternatively, power consumption measurement may be made in terms of number of internet accesses or a combination of accesses and data volumes downloaded or uploaded. Since the power measurements themselves consume power and resources, a sampling of power consumption is more likely. Then estimations of power consumption may be made during operation with a given wireless link for a service type.

In another example, audio or video streaming power consumption may be measured in terms of streaming minutes or data volume. Again, the radio frequency subsystem power consumption may be sampled during the duration of a streaming session and averaged or estimated for the streaming event. The content aware radio resource management system may also measure power consumption levels for SMTP, SMS, or other messaging. This may be done on a per data volume of the messages or based on the number of messages transmitted.

All of these measurements are then recorded and stored in the radio frequency and power consumption profile as energy link matrix data. This information may be referred to as a link energy consumption report or it may simply be part of a radio frequency profile in a mobile traffic report.

At step 680, the data from the periodic mobile information handling system power consumption scan is updated in an energy link data matrix stored on the mobile information handling system. For the given periodic scan interval, the context aware radio resource management system updates the energy link report matrix in the radio frequency profile. The energy link report matrix establishes the spatial-temporal mobile information handling system power consumption profile. The updated data is time or date stamped to establish its freshness. The system may repeat the periodic mobile information handling system power consumption scans and update the energy link data matrix for future intervals of time. Because measurement scans of this type may be costly in terms of resources and energy consumption, the frequency of such measurements may be limited by the context aware radio resource management system on the mobile device. In one embodiment, depth of wireless link data for statistical purposes at a given location and time may be achieved with crowd sourcing efforts.

At step 690, the spatial-temporal power consumption profile of the mobile information handling system and any associated confidence of estimate may optionally be advertised to the central server database for use by other mobile information handling systems. Thus, the mobile information handling system may provide its contribution to the crowd sourcing data for a time and location of a wireless link access. Alternatively, the mobile information handling system may store the mobile broadband traffic report locally. It may optionally respond to requests from a central server database with the radio frequency and wireless link power consumption profile information or reports.

Figure 7:
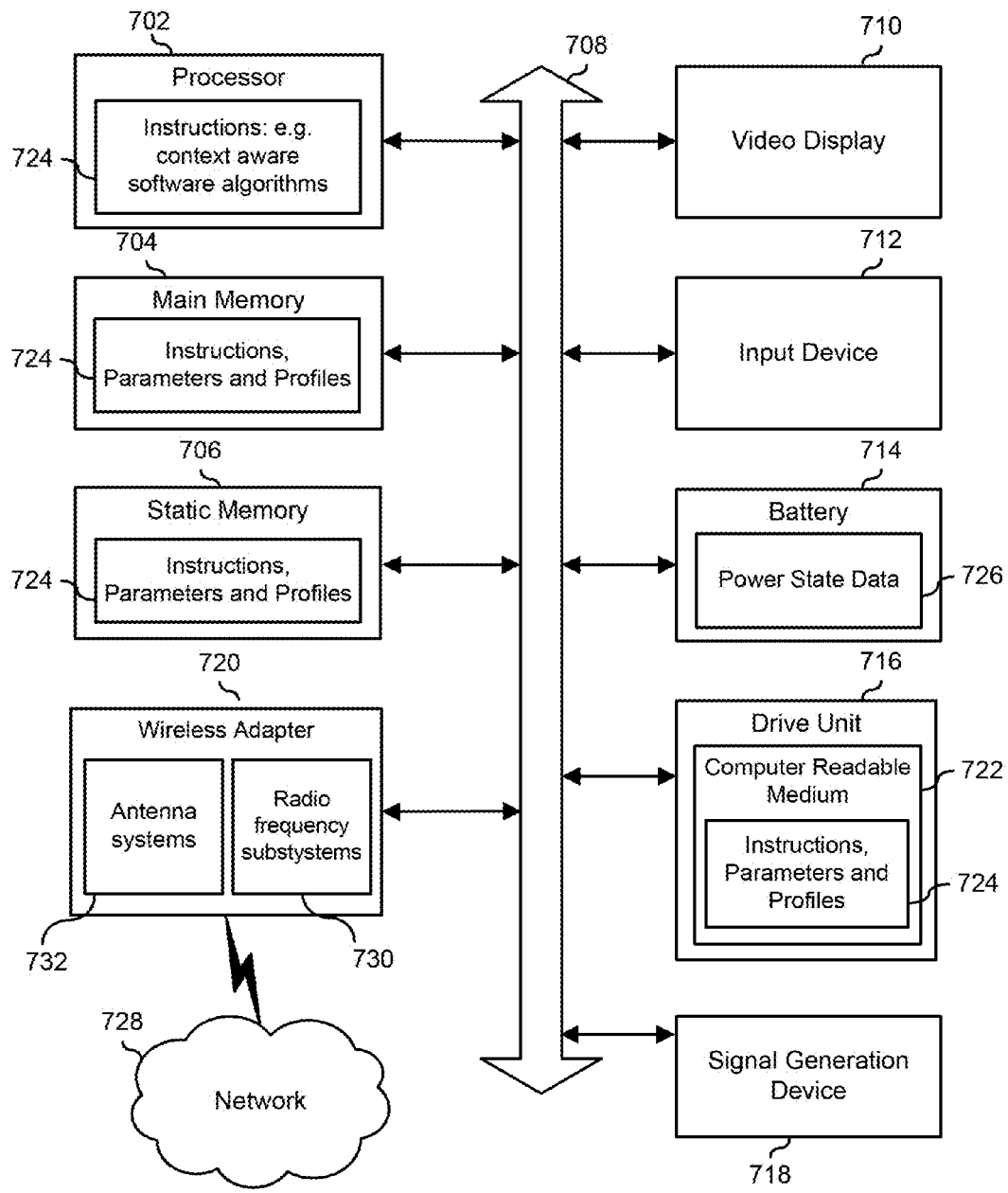
FIG. 7 is a block diagram illustrating an information handling system according to an embodiment of the present disclosure.

FIG. 7 shows an information handling system 700 capable of administering each of the specific embodiments of the present disclosure. The information handling system 700 can represent the user information handling systems 110, 120, and 130 or servers or systems located anywhere within network 100 of FIG. 1, including the remote data center 186 operating the virtual machine applications described herein. The information handling system 700 may include a processor 702 such as a central processing unit (CPU), a graphics processing unit (GPU), or both. Moreover, the information handling system 700 can include a main memory 704 and a static memory 707 that can communicate with each other via a bus 708. As shown, the information handling system 700 may further include a video display unit 710, such as a liquid crystal display (LCD), an organic light emitting diode (OLED), a flat panel display, a solid state display, or a cathode ray tube (CRT). Additionally, the information handling system 700 may include an input device 712, such as a keyboard, and a cursor control device, such as a mouse. The information handling system may include a power source such as battery 714 or an A/C power source. The information handling system 700 can also include a disk drive unit 716, and a signal generation device 718, such as a speaker or remote control. The information handling system 700 can include a network interface device such as a wireless adapter 720. The information handling system 700 can represent a server device whose resources can be shared by multiple client devices, or it can represent an individual client device, such as a desktop personal computer, a laptop computer, a tablet computer, or a mobile phone.

The information handling system 700 can include a set of instructions 724 that can be executed to cause the computer system to perform any one or more of the methods or computer based functions disclosed herein. For example, instructions 724 may execute the context aware radio resource management system disclosed herein. In a further example, processor 702 may conduct processing of wireless service usage by the information handling system 700 according to the systems and methods disclosed herein. The computer system 700 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 may include a computer-readable medium 722 in which one or more sets of instructions 724 such as software can be embedded. The disk drive unit 716 also contains space for data storage. Further, the instructions 724 may embody one or more of the methods or logic as described herein. For example, instructions relating to the context aware radio resource management software algorithms may be stored here. Additionally, parameters and profiles relating to context aware radio resource management system may be stored here. Parameters may include communication and efficiency rules or data relating to device-specific capabilities. Profiles stored here may include end-user profile data measured by the processor 702 during wireless service usage processing. Profiles may additionally include crowd source spatial-temporal radio frequency profiles for wireless links or energy link consumption data. In a particular embodiment, the instructions, parameters, and profiles 724 may reside completely, or at least partially, within the main memory 704, the static memory 707, and/or within the processor 702 during execution by the information handling system 700. The main memory 704 and the processor 702 also may include computer-readable media. Battery 714 may include a smart battery system that tracks and provides power state data 726. This power state data may be stored with the instructions, parameters, and profiles 724 to be used with the systems and methods disclosed herein.

The network interface device shown as wireless adapter 720 can provide connectivity to a network 728, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 720 may include one or more radio frequency subsystems 730 with transmitter/receiver circuitry, wireless controller circuitry, amplifiers and other circuitry for wireless communications. Each radiofrequency subsystem 730 may communicate with one or more wireless technology protocols. The radiofrequency subsystem 730 may contain individual subscriber identity module (SIM) profiles for each technology service provider and their available protocols. Alternatively it may have a software based SIM profile that is reconfigurable. The wireless adapter 720 may also include antenna system 732 which may be tunable antenna systems for use with the system and methods disclosed herein.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 724 or receives and executes instructions, parameters, and profiles 724 responsive to a propagated signal; so that a device connected to a network 728 can communicate voice, video or data over the network 728. Further, the instructions 724 may be transmitted or received over the network 728 via the network interface device or wireless adapter 720.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700. In a particular embodiment, BIOS/FW code 724 reside in memory 704, and include machine-executable code that is executed by processor 702 to perform various functions of information handling system 700. In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a wireless adapter for communicating via a wireless link;
    a storage device for storing a spatial-temporal user profile comprising wireless service usage trend data for the information handling system at a location where the information handling system is operating indicating an anticipated wireless service usage by the information handling system at the location;
    the storage device further storing radiofrequency wireless traffic reports indicating signal quality for a plurality of wireless links available at the location;
    an application processor associating the wireless service usage trend data with wireless links available at the location according to wireless link efficiency for the anticipated wireless service usage; and
    an application processor executing code of a context aware radiofrequency resource management system in determining link ratings for the plurality of wireless links available at the location based on the wireless service usage trend data for the information handling system and signal quality for the available wireless protocols for the anticipated wireless service usage.

2. The system of claim 1 further comprising:
    the application processor selecting an optimal wireless link based on the link ratings.

3. The system of claim 1, wherein the wireless traffic reports indicating signal quality further comprises signal to noise ratio data for wireless links available at the location.

4. The system of claim 1, wherein the wireless traffic reports include signal quality crowd sourced from a plurality of information handling systems previously operating on the wireless link at the location.

5. The system of claim 4, wherein the wireless traffic reports include signal quality crowd sourced from a plurality of information handling systems previously operating at the same time of day.

6. The system of claim 1, wherein the spatial-temporal user profile further comprises an estimated cyclostationary usage pattern of the information handling system.

7. The system of claim 6, wherein the cyclostationary usage pattern of the information handling system includes types of usage for times of day and confidence for the estimated cyclostationary usage pattern data.

8. A computer implemented method comprising:
    communicating via a wireless adapter with at least one wireless link;
    storing, in a storage device, a spatial-temporal user profile for an information handling system comprising wireless service usage trend data for the information handling system at an approximate time of day indicating an anticipated wireless service usage by the information handling system at the time of day;
    storing at the storage device radiofrequency wireless traffic reports indicating signal quality for a plurality of wireless links available for communication via a wireless adapter;
    associating, via a processor executing code of a context aware radiofrequency resource management system, the wireless service usage trend data with wireless links available at the time of day according to wireless link efficiency for the anticipated wireless service usage; and
    executing code of the context aware radiofrequency resource management system to determine link ratings for the plurality of wireless links available based on the wireless service usage trend data for the information handling system and signal quality for the available wireless protocols for the anticipated wireless service usage.

9. The method of claim 8 further comprising:
    determining an optimal wireless service provider based on the mobile wireless traffic report and the spatial-temporal user profile for the information handling system.

10. The method of claim 8 further comprising:
    determining an optimal wireless link based on the mobile wireless traffic report and the spatial-temporal user profile for the information handling system.

11. The method of claim 8, wherein the wireless traffic reports include a spatial-temporal radio frequency profile indicating radio signal quality for a wireless link at a location and at a time of day.

12. The method of claim 8, wherein the wireless traffic reports indicate radio frequency capacity and latency of responses across the wireless link.

13. The method of claim 12, wherein the spatial-temporal radio frequency profile includes s data indicating bit error rate of a wireless link.

14. The method of claim 8, wherein the spatial-temporal user profile further comprises an estimated cyclostationary usage pattern of the information handling system for a plurality of data usage types by the information handling system selected from a group comprising voice communications, internet accesses, email messaging, and video streaming.

15. A computer-implemented method for selecting a wireless link, the method comprising:
communicating via a wireless adapter with at least one wireless link;
storing, in a storage device, a spatial-temporal user profile for an information handling system comprising wireless service usage trend data for the information handling system at a location;
storing at the storage device radiofrequency wireless traffic reports indicating signal quality for a plurality of wireless links available for communication via a wireless adapter; and
executing code of a context aware radiofrequency resource management system via an application processor to determine link ratings for the plurality of wireless links available based on the wireless service usage trend data for the information handling system and signal quality for the available wireless protocols for anticipated wireless service usage;
selecting via the application processor an optimal available wireless service provider and wireless protocol based on the lowest anticipated power consumption for an anticipated wireless service usage at the location.

16. The method of claim 15, wherein the radiofrequency wireless traffic reports further comprise data indicating power consumption for wireless services across the wireless links.

17. The method of claim 15, wherein the radiofrequency wireless traffic reports include spatial-temporal radio frequency profiles indicating signal quality for times and locations of the plurality of wireless links.

18. The method of claim 15 further comprising:
detecting a battery power level for the information handling system below a threshold level; and
increasing a power consumption weighting factor applied to link rating determinations for the plurality of wireless links.

19. The method of claim 15 further comprising:
applying a subscriber cost weighting factor to link rating determinations for the plurality of wireless links.

20. The method of claim 15, wherein the spatial-temporal user profile for an information handling system further comprises wireless service usage trend data for time periods during a course of a day.

* * * * *